United States Patent [19]

Tuggle et al.

[11] 4,421,176
[45] Dec. 20, 1983

[54] PORTABLE POWER OPERATED CULTIVATOR WITH AXIALLY ADJUSTABLE SHIELD

[75] Inventors: Lloyd H. Tuggle, Shreveport; Ronald C. Loyd, Keithville, both of La.

[73] Assignee: Emerson Electric Co., Shreveport, La.

[21] Appl. No.: 210,028

[22] Filed: Nov. 24, 1980

[51] Int. Cl.³ .............................................. A01B 33/02
[52] U.S. Cl. .................................... 172/41; 172/112; 172/555
[58] Field of Search ...................... 172/39, 41, 42, 43, 172/123, 555, 112

[56] References Cited

U.S. PATENT DOCUMENTS

| 551,395 | 12/1895 | Morgan | 172/555 |
|---|---|---|---|
| 2,679,794 | 6/1954 | Ober | 172/42 |
| 2,691,933 | 10/1954 | Emerson | 172/548 |
| 2,823,597 | 2/1958 | Kelsey | 172/41 |
| 2,847,924 | 8/1958 | Quick | 172/42 |
| 2,888,994 | 6/1959 | Hoff et al. | 172/41 X |
| 3,031,018 | 4/1962 | Smithers | 172/41 |
| 3,760,884 | 9/1973 | Webster et al. | 172/555 |
| 3,766,988 | 10/1973 | Whitesides | 172/555 X |
| 4,049,059 | 9/1977 | Weibling | 172/41 X |
| 4,062,408 | 12/1977 | Enters et al. | 172/42 X |
| 4,256,183 | 3/1981 | Hanley | 172/42 |

FOREIGN PATENT DOCUMENTS

| 206200 | 2/1957 | Australia | 172/42 |
|---|---|---|---|
| 2016511 | 10/1971 | Fed. Rep. of Germany | 172/42 |
| 639266 | 3/1928 | France | 172/555 |
| 194113 | 2/1938 | Switzerland | 172/42 |

*Primary Examiner*—Richard T. Stouffer
*Attorney, Agent, or Firm*—Hubbard, Thurman, Turner & Tucker

[57] ABSTRACT

A portable power operated cultivator includes a power unit comprising an internal combustion engine having a handle portion and being connected to one end of an elongated boom. A right angle gear drive mechanism is mounted on the opposite end of the boom and is driveably interconnected with the power unit by an elongated drive shaft disposed within the boom. An output shaft extends from opposite sides of the gear drive unit and is adapted to mount respective rotary cultivator blades on the ends thereof. A second handle is adjustably mounted on the boom to provide for a balanced weight distribution of the cultivator unit. The spaced apart cultivator blades are identical and include a plurality of radially projecting ground engaging tines. Adjacent tines on each blade have tip portions which are bent in the opposite direction with respect to each other along a bend line which provides for a positive angle of incidence or entry of the tine into the earth being worked by the cultivator. The tines of one blade are angularly offset with respect to the tines of the other blade to enhance the digging action of the cultivator unit.

2 Claims, 7 Drawing Figures

U.S. Patent  Dec. 20, 1983  Sheet 1 of 2  4,421,176
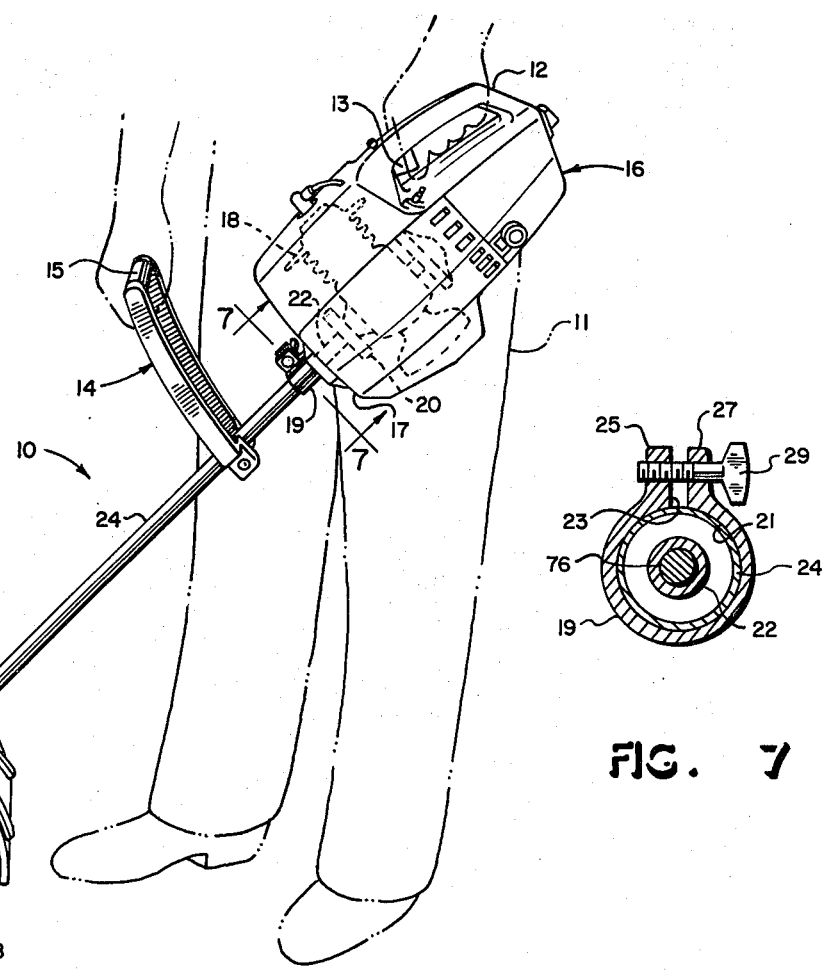
FIG. 1
FIG. 7
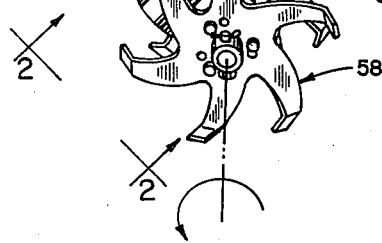
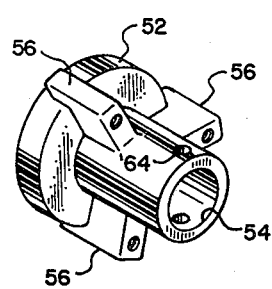
FIG. 6
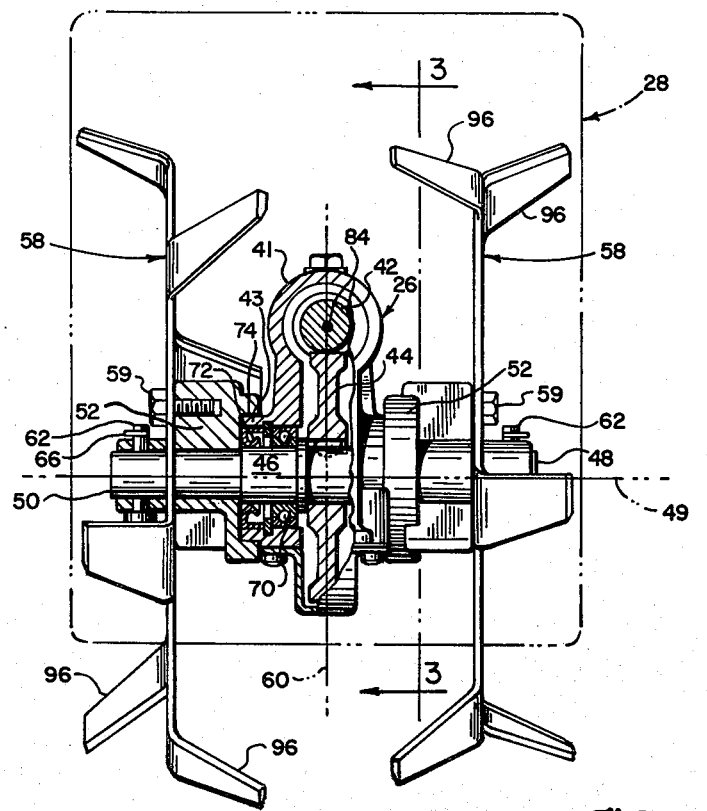
FIG. 2

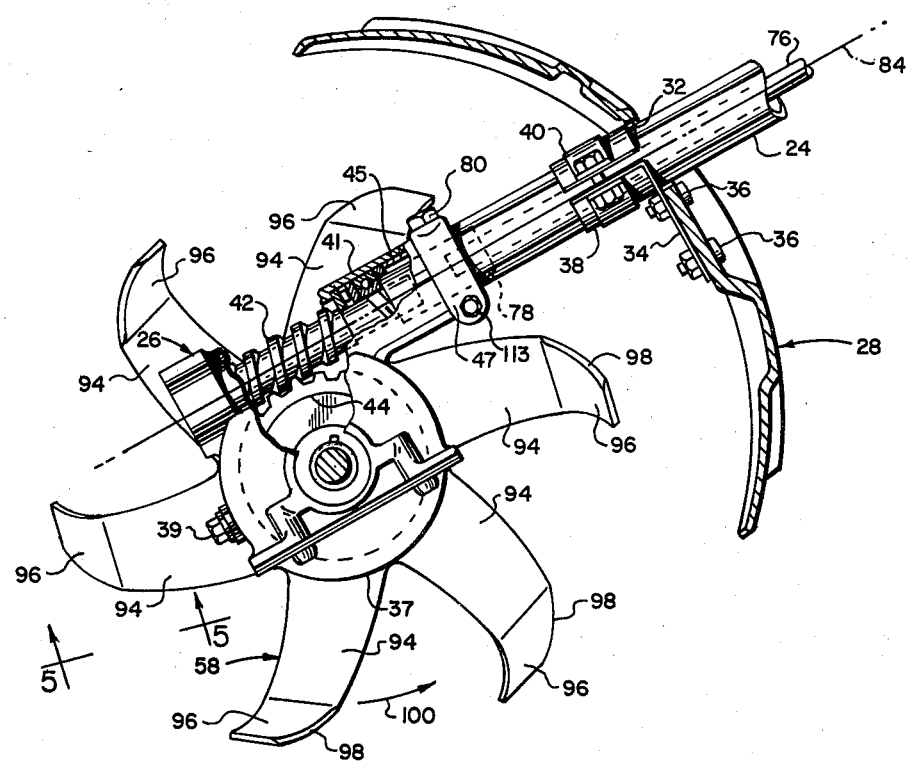
FIG. 3
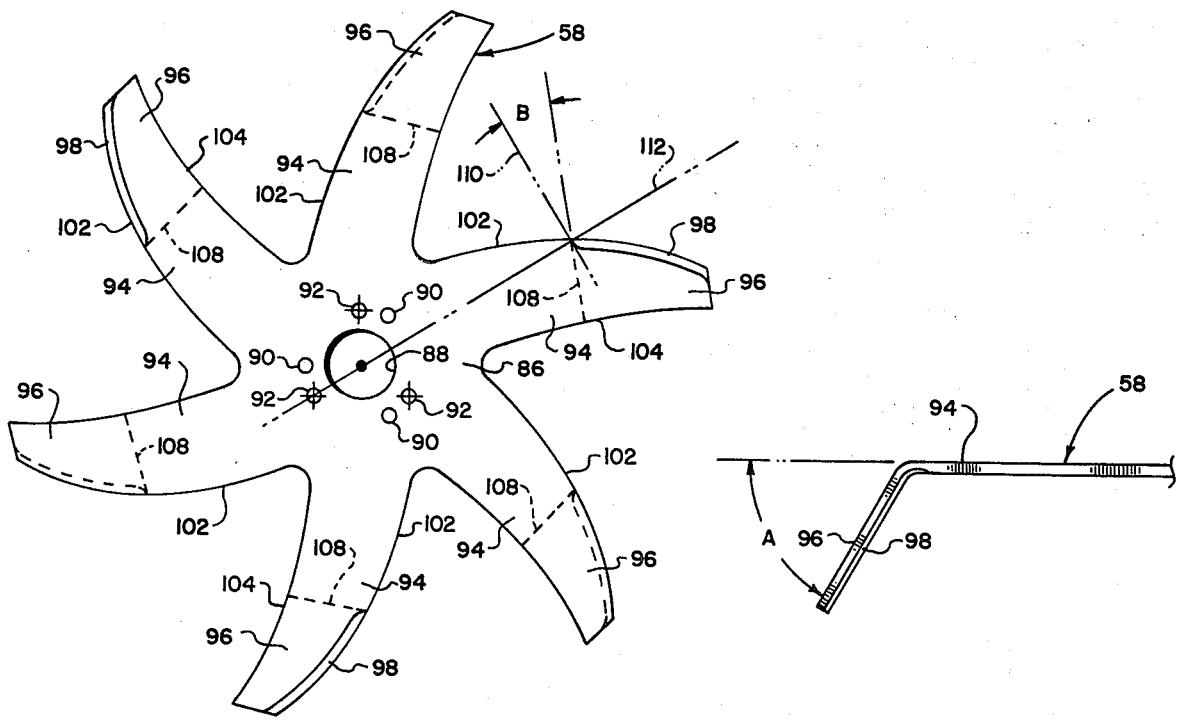
FIG. 4
FIG. 5

PORTABLE POWER OPERATED CULTIVATOR WITH AXIALLY ADJUSTABLE SHIELD

BACKGROUND OF THE INVENTION

1. Field of the Invention

This invention pertains to a hand carried, engine driven rotary cultivator apparatus.

2. Background Art

In the art of cultivator apparatus for preparing and working relatively small plots of land for gardens, flower and shrubbery beds and the like there has been a growing need for apparatus which is easily manipulated to loosen the earth and destroy weeds around plants and shrubs as well as to prepare seed beds for planting. Most known types of cultivator apparatus are adapted to be mounted on wheels or the like, are somewhat heavy and bulky and lack the maneuverability desirable for working relatively small plots of land such as gardens or flower and shrubbery beds.

For example, a great deal of ornamental landscaping is done wherein terraced or elevated flower and shrubbery beds are built. The care and maintenance of such beds is difficult with wheel mounted cultivator apparatus because of the difficulty of moving such apparatus from one level to another. Moreover, heretofore known apparatus for cultivating gardens and shrubbery beds have lacked the maneuverability and handling characteristics desirable to provide adequate cultivation without unwanted destruction or damage to plants or shrubs.

In the development of portable power operated cultivator apparatus there has been a long felt need for apparatus which is easily carried and maneuvered to provide for cultivating the soil around closely spaced plants as well as for preparing soil in relatively small plots of ground which are inaccessible to wheel mounted equipment.

There has also been a long felt need for hand carried power operated cultivators which may be operated for relatively long periods of time without tiring the operator. Although portable, engine driven, rotary cultivators of various types have been developed, it is believed that improvements which have been sought in such apparatus have been unfulfilled prior to the development of the present invention.

SUMMARY OF THE INVENTION

The present invention provides for a hand carried engine driven rotary cultivator which is compact, lightweight, easily maneuvered and is particularly adaptable for cultivating gardens, flower beds, shrubbery beds and plots which are relatively inaccessible to wheel mounted apparatus for one reason or another.

In accordance with the present invention there is provided a rotary cultivator comprising a hand carriable power unit which is drivably connected to a pair of spaced apart rotary cultivator blades disposed at one end of an elongated boom which is connected at its opposite end to the power unit. In a preferred embodiment of the present invention the power unit comprises a lightweight easily carried internal combustion engine unit or so called "power handle" of the type disclosed in U.S. Pat. No. 4,296,675, and which is assigned to the assignee of the present invention. In accordance with the present invention the internal combustion engine power unit is connected to an elongated tubular boom which supports a rotary drive shaft connected to the engine at one end and to a gear drive unit disposed at the other end of the boom.

In accordance with one aspect of the present invention the improved cultivator apparatus is particularly easily carried and maneuvered in operation thanks to the arrangement of a handle which is adjustably mounted on the boom and a second handle which is provided on the power unit. Accordingly, the weight of the gear drive unit and cultivator blades at one end of the boom is substantially balanced by the weight of the power unit disposed at the opposite end of the boom whereby the maneuverability and handling characteristics are improved.

In accordance with another aspect of the present invention a portable rotary cultivator is provided having a pair of spaced apart rotary cultivator blades mounted on a right angle drive unit which is disposed between the cultivator blades and is adapted to be mounted at the end of an elongated mounting boom. The relatively lightweight and centered drive arrangement for the cultivator blades further enhances the maneuverability and ease of operation of the cultivator.

In accordance with yet another aspect of the present invention a portable rotary cultivator unit is provided with a compact and simplified gear drive unit having an output shaft with oppositely projecting cantilever end portions on which are, respectively, mounted rotary cultivator blades of an improved design. The cultivator blades are mounted on the drive shaft portions by removable hubs of a superior design.

The present invention still further provides for a cultivator apparatus having improved rotary cultivator blades which are particularly adapted for use with apparatus having a so called center drive arrangement whereby oppositely projecting shaft portions are provided and adapted to driveably support the cultivator blades themselves. The rotary cultivator blade has a plurality of generally radially projecting tines the geometry of which is particularly suitable for use in conjunction with the lightweight, hand carried, rotary cultivator of the present invention. The improved cultivator blade of the present invention is adapted to be mounted on either of oppositely projecting shaft portions of a center type drive and to provide for balancing reaction forces imposed on the cultivator apparatus in operation.

The abovenoted superior features of the present invention together with others will be further appreciated upon reading the detailed description which follows in conjunction with the drawings.

BRIEF DESCRIPTION OF THE DRAWINGS

FIG. 1 is a perspective view showing an operator holding the rotary cultivator apparatus of the present invention in a typical working position;

FIG. 2 is an end view, partially sectioned, of the center type drive mechanism for the cultivator apparatus taken generally from the line 2—2 of FIG. 1;

FIG. 3 is a side elevation taken from the line 3—3 of FIG. 2 showing the drive gear unit partially sectioned;

FIG. 4 is a plan view of one of the rotary cultivator blades illustrating the shape of the tines and showing the tines in their unbent position;

FIG. 5 is a detail view taken substantially from the line 5—5 of FIG. 3 showing the bend angle of the tines of the cultivator blades;

FIG. 6 is a perspective view of one of the cultivator blade drive hubs; and

FIG. 7 is a section view taken from the line 7—7 of FIG. 1.

DESCRIPTION OF THE PREFERRED EMBODIMENT

Referring to FIG. 1, the improved rotary cultivator apparatus of the present invention is shown and generally designated by the numeral 10. The apparatus 10 is particularly adapted to be hand carried in transportation and in use by a human operator 11 and is provided with carrying handles 12 and 14. The carrying handle 12 is formed as part of a lightweight portable power unit generally designated by the numeral 16 and characterized by a single cylinder reciprocating air cooled engine 18. The engine 18 is provided with a suitable rotary output drive mechanism which includes a centrifugal clutch generally designated by the numeral 20. The clutch 20 is provided with an output power takeoff shaft portion 22 adapted to be driveably connected to an elongated drive shaft to be discussed in further detail herein. The power unit 16 is preferably of the type disclosed in the aforementioned U.S. Pat. No. 4,296,675 and is of a superior design which is lightweight, substantially balanced along its longitudinal central axis, and easily maneuverable.

The power unit 16 is suitably connected to one end of an elongated tubular boom 24, the opposite end of which is connected to a gear drive unit generally designated by the numeral 26. The boom 24 may be connected to the power unit 16 by a coupling arrangement as disclosed in the aforementioned patent application or by means of a clamping arrangement as shown in FIG. 7 of the drawings. The main housing 17 of the power unit 16 includes an integral boss 19 having a socket formed by a bore 21 in which one end of the boom 24 is retained. The boss 19 includes a longitudinal slot 23 formed between radially projecting ears 25 and 27 which may be drawn toward each other by a threaded clamping member 29 to provide a circumferential clamping force on the tubular boom 24.

Referring again to FIG. 1 the handle 14 includes a transverse handlebar 15 and is adapted to be adjustably mounted on the boom 24 in the manner described in the aforementioned U.S. Pat. No. 4,296,675 whereby the proper position of the handlebar and balance of the cultivator apparatus may be obtained to suit the operator.

Referring to FIGS. 1 and 3 the cultivator apparatus 10 includes a shield 28 which is adapted to be adjustably mounted on the boom 24. The shield 28 is characterized by a substantially rectangular shaped plate member which is bent along its major axis to an arcuate shape as illustrated in FIG. 3. The shield 28 may be formed as a lightweight metal stamping having integrally formed rib portions 30 to enhance the rigidity of the shield. The shield 28 is also formed with an opening 32 through which the tubular boom 24 projects as shown in FIG. 3. The shield 28 is secured to the boom by a clamp comprising a sheet metal plate 34 secured to the shield by suitable fasteners 36 and having a recessed portion 38 adapted to fit partially around the boom 24. A cap 40 is suitably secured to the plate 34 by threaded fasteners to clamp the shield 28 in a suitable position on the boom 24 as shown in FIG. 3.

Referring to FIGS. 2 and 3, in particular, the drive unit 26 includes a housing 41 in which is rotatably mounted drive mechanism comprising a worm gear 42 which is meshed with a gear 44. The gear 44 is driveably mounted on a drive shaft 46 having oppositely projecting end portions 48 and 50 which project from opposite sides of the housing 41 and driveably support, respectively, hubs 52. As shown also by way of example in FIG. 6 each of the hubs 52 has an axial bore 54 and three equally spaced radially projecting bosses 56. The hubs 52 are each adapted to have mounted thereon respective rotary cultivator blades generally designated by the numeral 58. The blades 58 are spaced substantially equidistant on either side of a center line of the drive mechanism 26 and indicated by the numeral 60 as shown in FIG. 2. The hubs 52 are each drivably connected to the shaft 46 by means of removable drive pins 62 which project through suitable transverse bores provided in the shaft end portions 48 and 50 and complementary bores 64 provided in each of the hubs 52. The drive pins 62 are retained by suitable spring clip type retaining rings 66.

Referring further to FIG. 2 the shaft 46 is suitably mounted in spaced apart bearings 70, one shown, disposed on either side of the gear 44 within the housing 41. The housing 41 includes axially projecting annular bosses 43, one shown, which support the bearings 70 and respective seal assemblies 72, as shown by way of example, in FIG. 2. The hubs 52 include cylindrical recesses 74 which, when assembled on the shaft 46, overlie the bosses 43 to shield the seals 72 from foreign material such as the earth being worked by the cultivator 10.

Referring now to FIG. 3, in particular, the worm 42 is rotatably driven by an elongated drive shaft 76 mounted within the boom 24 and drivably connected at one end to the power takeoff shaft portion 22 at the other end to a coupling member 78 which in turn is drivably connected to the worm 42. The shaft 76 may be supported within the tubular boom 24 in the manner described in U.S. patent application Ser. No. 095,575, filed: Nov. 19, 1979, now abandoned, and assigned to the assignee of the present invenion. The worm 42 is suitably mounted on bearings disposed within the housing 41, which also is adapted to receive one end of the boom 24 within a bore 45 formed within an axially projecting boss 47. The boom 24 is suitably retained in connection with the housing 41 by a threaded fastener 80. The axially projecting boss 47 is split longitudinally in a manner similar to the boss 19 to provide for a clamping action on the end of the boom 24 with the aid of a threaded fastener 113. Accordingly, the boom 24 is connected to the housing 41 in a manner similar to the connection between the boom and the power unit 16.

As will be appreciated from the foregoing the drive unit 26 provides for a final output drive arrangement which is substantially perpendicular to the longitudinal axis of the boom 24 and the coincident axis of rotation of the drive shaft 76 and which is designated by the numeral 84 in FIG. 3. Moreover, the drive unit 26 also provides for the cultivator blades to be spaced equidistant on each side of a center plane defined by the axis 84 and the center line 60. The arrangement in the cultivator 10 of a power unit disposed at one end of an elongated boom, a drive unit disposed at the opposite end of the boom, and a "centered" drive mechanism which provides for the cultivator blades to be spaced equidistant on each side of the longitudinal center line of the boom synergistically provides a cultivator unit which is particularly easy to manipulate in operation and carry to and from the work site. The overall handling characteristics of the cultivator unit 10 are further enhanced by the handle 14 which may be adjustably positioned along the boom 24.

The drive mechanism 41 also advantageously provides for a substantial reduction in the rotational speed of the cultivator blades with respect to the rotational speed of the drive shaft 76, the latter being directly connected to the engine power takeoff shaft 22. It has been determined that, in order to achieve a suitable rotational speed of the cultivator blades 58, a gear ratio of input speed to output speed in a range of 30:1 to 40:1 is preferred. Although other types of so called right angle drive mechanisms may used in place of the drive unit 26, for example a bevel gear drive, the worm gear drive provides for the relatively high speed reduction ratios required as well as symmetry about the plane defined by the axes 60 and 84.

The cultivator unit of the present invention also includes an improved rotary cultivator blade which has been particularly adapted to be used in conjunction with the lightweight, balanced cultivator unit 10. Because the cultivator unit 10 is particularly well balanced, in order to further improve its handling characteristics, it has been determined that a cultivator blade of a preferred type was desired to provide suitable engagement and working of the earth and to prevent the unit from tending to "walk" along the surface of the soil area to be worked. Referring to FIGS. 4 and 5 the cultivator blade 58 is preferably formed of cold rolled steel plate suitably hardened to provide the desired wear characteristics and to retain cutting edges on the blade tines which will be described herein. The blade 58 includes a hub portion 86 having a central bore 88 to provide for mounting the blade on the hub 52. The hub portion 86 also includes two sets of mounting holes 90 and 92, each set having three holes spaced approximately one hundred twenty degrees apart. The mounting holes 92 are angularly spaced approximately thirty degrees from the respective adjacent mounting holes 90. The blade 58 also includes six substantially radially projecting tines 94 having tip portions 96 which are adapted to be bent away from the plane of the hub portion 86 as indicated in FIG. 5. Every other tip 96 is bent in the same direction from the plane of the hub portion 86 and adjacent tips are bent in opposite directions but to the same angle A with respect to the plane of the base of the tines 94 and the hub portion 86. Each tip 96 is also provided with a cutting edge 98 as shown in FIGS. 4 and 5. The surface which is relieved to form the cutting edges 98 is disposed on the radial inward side of the tips 96 in the bent position and, accordingly, adjacent tips are relieved or sharpened on opposite sides of the tips and along the leading edges thereof.

As shown in FIG. 4, the tines 94 of the cultivator blade 58 are formed with a so called backward sweep with respect to the direction of rotation of the blade as indicated by the arrow 100 in FIG. 3. The leading edge 102 of each tine 94 and including the tip portion 96 is of convex arcuate curvature. The trailing edge 104 of each tine is also curved in the same general direction as the leading edge 102 and, accordingly, has a concave curvature. As shown in FIG. 4, which is a pattern or planar development of the blade 58, the tips 96 are bent with respect to the base portion of the tines 94 along a bend line designated by the numeral 108. It has been determined in order to provide suitable engagement of the tines of the blades 58 in operation of the cultivator that the leading edge of the tip should form an angle which tends to promote engagement of the tines with the earth being worked so that the cultivator does not tend to merely "walk" along the surface of the soil area to be cultivated. A proper engagement angle of the cultivator blade tines also provides a degree of self propelling of the cultivator along the work path so that the operator is not required to "push" the cultivator but is able to exercise better control by slightly holding back on the cultivator unit as it is moved along the surface to be worked.

It has been determined that the bend lines 108 should form an angle B with respect to a line 110 normal to a radial line 112 passing through the central axis of the blade bore 88 and the intersection of the leading edge 102 with the bend line 108. It has been determined that suitable operation of the cultivator unit may be obtained when the angle B is in the range of ten to thirty degrees. Moreover, aa preferred value for the angle A has been determined to be approximately sixty degrees.

By providing the cultivator blade 58 with an equal number of tines 94 and with dual sets of mounting holes 90 and 92 it is possible to use the blade interchangeably mounted on each of the hubs 52 on opposite sides of the housing 41. The tines of the respective blades are preferably angularly spaced with respect to the axis of rotation 49 of the shaft 46 so that viewed in the plane of rotation of the blades the tines of one blade are angularly spaced approximately 30° with respect to the tines of the other blade. This arrangement is made possible by the respective sets of mounting holes 90 and 92. This arrangement also enhances the "digging" characteristics of the cultivator and reduces the tendency for the cultivator to walk or hop along the surface of the soil to be worked. The above noted features of the improved cultivator blade of the present invention are particularly advantageously utilized in the arrangement of the hand carried and operated cultivator 10 especially when the cultivator is being operated in fairly hard or compacted soil.

The operation of the cultivator 10 is believed to be readily understandable from the foregoing description of the detailed features thereof. Prior to operation of the cultivator unit 10 the operator 11 might prefer to adjust the position of the handle 14 to suit the particular balance or "feel" preferred by the particular operator. The power unit 16 includes a digitally operated throttle lever 13 adapted to operate the engine 18 through its speed range. Once the engine 18 has been started and brought up to speed sufficient to engage the clutch 20 the shaft 76 rotatably drives the cultivator blades 58 through the gearing provided in the drive mechanism 26 as will be readily understandable from the foregoing detailed description. Thanks to the overall arrangement of the cultivator wherein the engine or power unit 16 is mounted at one end of an elongated boom opposite the working end on which the cultivator blades are mounted, and further due to the improved cultivator blade design, an easily manipulated and operated unit is provided which is particularly advantageous for use in gardens and plots which are relatively inaccessible for one reason or another.

It will further be appreciated that each of the cultivator blades 58 may be easily replaced by removal of the hub 52 and blade 58 in assembly through removal of the retaining ring 66 and the pin 62. The blades 58 are easily mounted on and removed from the hub 52 by means of threaded fasteners 59. Lubrication of the interior of the gear housing 41 may be achieved by removal of a threaded plug 39, as shown in FIG. 3 and injection of a suitable quantity of lubricant into the interior of the housing. Drainage of lubricant from the housing 41 and cleaning thereof, if needed, as well as replacement of the gear 44 may be achieved by removal of a housing cover portion 37.

Although the present invention has been described with reference to a preferred embodiment, it will be appreciated by those skilled in the art that additions, deletions, modifications, substitutions and other changes not specifically described and illustrated in this embodiment may be carried out to achieve the objects of the invention and fall within the scope and spirit of the appended claims.

What is claimed is:

1. A portable power operated cultivator comprising:
   a power unit including an internal combustion engine having a power takeoff shaft;
   an elongated boom connected at one end to said power unit and including a drive shaft connected to said power takeoff shaft;
   drive means disposed on said boom at the end opposite said one end, said drive means including an output shaft having oppositely projecting end portions, said output shaft being drivenly connected to said drive shaft and having an axis of rotation substantially perpendicular to the axis of rotation of said drive shaft;
   rotary cultivator blade means drivably mounted on respective ones of said opposite end portions of said output shaft and on opposite sides of said axis of rotation of said drive shaft;
   means for carrying said cultivator and manipulating said cultivator during the operation thereof including first handle means disposed at one end of said boom and mounted on said power unit and second handle means adjustably mounted on said boom between said first handle means and said drive means, and a shield mounted on said boom between said second handle means and said drive means, said shield comprising a plate secured to said boom for deflecting material impelled by said blade means toward said handle means, said shield being secured to said boom in such a way that said shield can be adjustably positioned axially along said boom but cannot be displaced about the axis of rotation of said output shaft to reduce the shielded area between said blade means and said handle means.

2. The invention set forth in claim 1 wherein:
   said plate includes a bore formed generally in the center of said plate through which said boom extends and said plate includes a bracket for supporting said shield on said boom.

* * * * *